US007370079B2

(12) United States Patent
Murata et al.

(10) Patent No.: US 7,370,079 B2
(45) Date of Patent: May 6, 2008

(54) SYSTEM FOR SENDING AND RECEIVING E-MAIL TO WHICH A PLURALITY OF POSITIONAL DATA ARE ATTACHABLE

(75) Inventors: Satoshi Murata, Wako (JP); Takeshi Imai, Wako (JP); Yuichiro Watanabe, Tokyo (JP)

(73) Assignee: Honda Giken Kogyo Kabushiki Kaisha, Minato-ku, Tokyo (JP)

( * ) Notice: Subject to any disclaimer, the term of this patent is extended or adjusted under 35 U.S.C. 154(b) by 549 days.

(21) Appl. No.: 09/739,397

(22) Filed: Dec. 19, 2000

(65) Prior Publication Data

US 2001/0005854 A1 Jun. 28, 2001

(30) Foreign Application Priority Data

Dec. 28, 1999 (JP) ............................... 11-377306

(51) Int. Cl.
 *G06F 15/16* (2006.01)
(52) U.S. Cl. .................. 709/206; 709/203; 709/232; 701/200; 707/10
(58) Field of Classification Search ................ 709/206, 709/223, 238, 245, 200, 203, 232; 707/10, 707/100
 See application file for complete search history.

(56) References Cited

U.S. PATENT DOCUMENTS

| 5,781,901 A * | 7/1998 | Kuzma ......................... 707/10 |
| 5,903,723 A * | 5/1999 | Beck et al. ................. 709/200 |
| 5,937,162 A * | 8/1999 | Funk et al. ................. 709/206 |
| 6,047,327 A * | 4/2000 | Tso et al. ................... 709/232 |
| 6,233,506 B1 * | 5/2001 | Obradovich et al. .......... 701/1 |
| 6,332,127 B1 * | 12/2001 | Bandera et al. .............. 705/14 |
| 6,847,969 B1 * | 1/2005 | Mathai et al. ............. 707/100 |

FOREIGN PATENT DOCUMENTS

JP 10-307038 A 11/1998

(Continued)

OTHER PUBLICATIONS

"How to Solve Problems of Daily Life", Kotani et al, *Nikkei PC 21*, Japan, Nikkei Business Publications, Inc., Sep. 1, 1998, vol. 3, No. 10, p. 67.

(Continued)

*Primary Examiner*—Yves Dalencourt
(74) *Attorney, Agent, or Firm*—Arent Fox, PLLC

(57) ABSTRACT

An e-mail sending and receiving system in which positional data about a plurality of places can be included in an e-mail message to be sent, and further detailed data can be obtained based on the included positional data, thereby improving the convenience and effectiveness of the positional data. The system includes a mail generating section for generating an e-mail message to be sent to an addressee; a positional data storage section for storing a plurality of positional data; and a positional data attaching section for attaching one or more of the positional data stored in the positional data storage section to the e-mail message generated by the mail generating section. The system may further include a section for generating detailed data relating to each positional data attached to the e-mail message, and attaching a URL for accessing the detailed data to the e-mail message.

19 Claims, 17 Drawing Sheets

FOREIGN PATENT DOCUMENTS

| | | |
|---|---|---|
| JP | A-11-53278 | 2/1999 |
| JP | A-11-259390 | 9/1999 |
| JP | 11-341074 A | 12/1999 |

OTHER PUBLICATIONS

"Even More Useful if You Know How to Use Them! Choose Mapping Sites According to Your Goals! Important Data for Five Major Mapping Sites", *INTERNET Magazine*, Japan, Impress Corporation, Aug. 1, 1998, No. 43, pp. 308-315.

Partial English translation of pertinent portions of "How to Solve Problems of Daily Life", Kotani et al, *Nikkei PC 21*, Japan, Nikkei Business Publications, Inc., Sep. 1, 1998, vol. 3, No. 10, p. 67.

Partial English translation of pertinent portion of "Even More Useful if You Know How to Use Them! Choose Mapping Sites According to Your Goals! Important Data for Five Major Mapping Sites", *INTERNET Magazine*, Japan, Impress Corporation, Aug. 1, 1998, No. 43, pp. 308-315.

\* cited by examiner

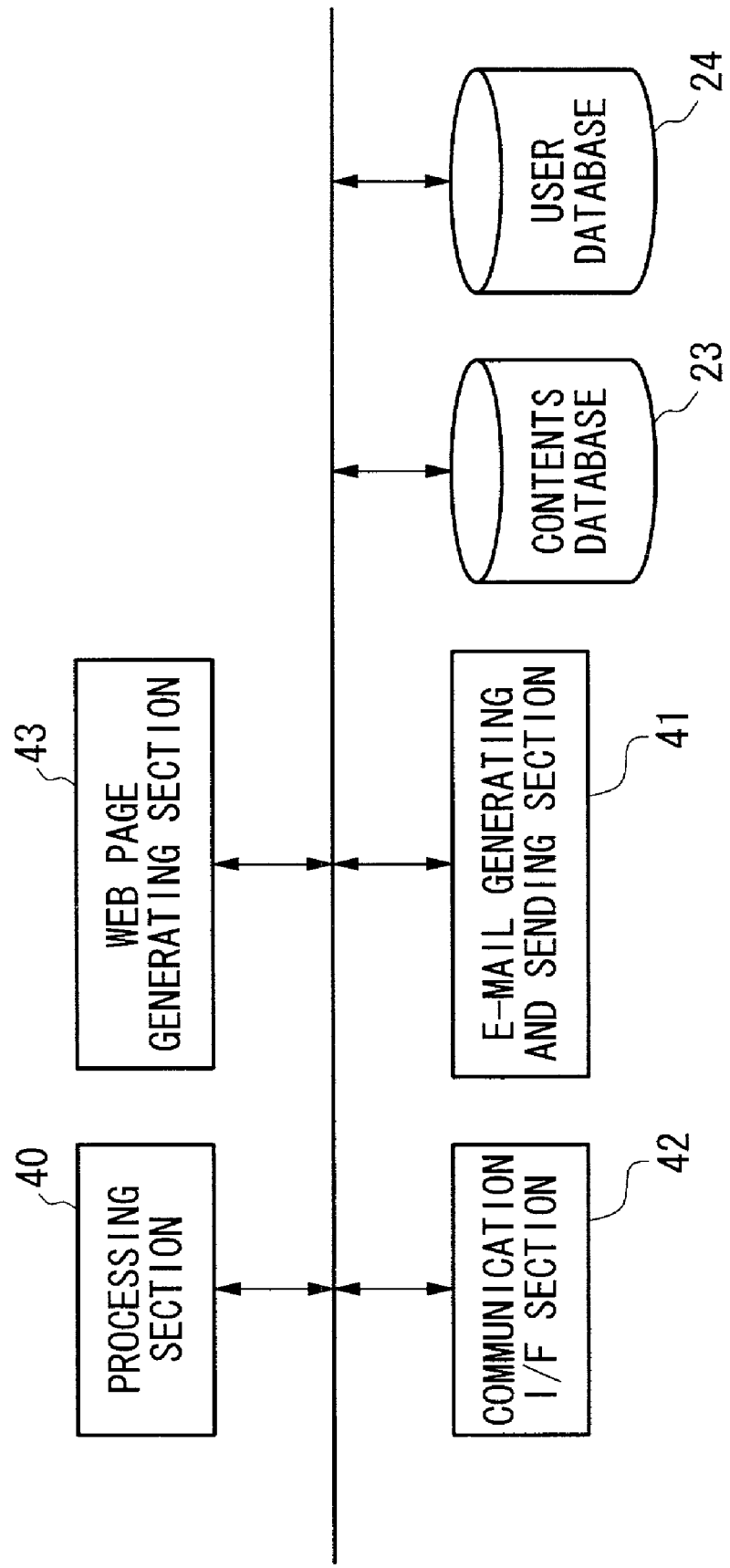

FIG. 3A

| SPOT NAME | POSITIONAL DATA | ADDITIONAL DATA |

FIG. 3B

| USER ID | PASSWORD | USER DATA |

FIG. 4A

| SPOT NAME | CATEGORY NAME |
| SPOT NAME | CATEGORY NAME |
| SPOT NAME | CATEGORY NAME |

FIG. 4B

| | SPOT NAME |
|---|---|
| COURSE NAME | SPOT NAME |
| | SPOT NAME |
| | SPOT NAME |
| COURSE NAME | SPOT NAME |
| | SPOT NAME |
| | SPOT NAME |

FIG. 18

Transmission completed

E-mail message has been normally sent.
Return to the top page of NAVI MAIL if
another e-mail message is to be sent.

 Return to top of NAVI MAIL

FIG. 22

| List of attached spots | | |
|---|---|---|
| Return | Top | |

・1/1 (3 items in all)

 Yokohama port "Watch-night whistle"
Yamashita-cho, Naka-ku,
Yokohama-shi, Kanagawa
045 (641) 4361

 Daikon (Radish) festival, *Hannya* seminar
Asakusa, Taito-ku, Tokyo
03 (3874) 2030

 Millennium event in Choshi
8553, Kimigahama, Choshi-shi, Chiba

Set destination —96

FIG. 23

```
┌─────────────────────────────────────────────┐
│  Enjoy Yokohama                             │
│  ┌──────┬─────┐                             │
│  │Return│ Top │                             │
│  └──────┴─────┘                             │
│  watanabe@abc.co.jp 12/15                   │
│  ┌─────────────────────────────────────┐    │
│  │ Enjoy Yokohama                      │    │
│  │                                     │    │
│  │ Address:  Yamashita-cho, Naka-ku,   │    │
│  │           Yokohama-shi, Kanagawa    │    │
│  │ Phone number:  045(123)4567         │    │
│  │                                     │    │
│  │ ┌───────────────┐  ┌──────────┐     │    │
│  │ │Set destination│  │ Set mark │     │    │
│  │ └───────────────┘  └──────────┘     │    │
│97─┘                                         │
│              ┌─────┐       ┌──────┐         │
│         98─┬─│Reply│       │Delete│─┬─99    │
│              └─────┘       └──────┘         │
└─────────────────────────────────────────────┘
```

FIG. 24

```
┌─────────────────────────────────────────────┐
│  Let's go to a festival.                    │
│  ┌──────┬─────┐                             │
│  │Return│ Top │                             │
│  └──────┴─────┘                             │
│  watanabe@abc.co.jp 12/15                   │
│  ┌─────────────────────────────────────┐    │
│  │ Year-end merrymaking at festival!   │    │
│  │                                     │    │
│  │ Spot information is attached to this mail.│
│  │ ┌───────────────┐                   │    │
│  │ │Set destination│                   │    │
│  │ └───────────────┘                   │    │
│100┘    ┌─────┐      ┌──────┐                │
│    101─│Reply│      │Delete│─102            │
│        └─────┘      └──────┘                │
│  ※The attached spot information is not      │
│    available after 30th day from the date   │
│    on which this mail was written.          │
└─────────────────────────────────────────────┘
```

FIG. 25

Absorbed in festivals

◀▶ Return | Top

·1/1 (3 items in all)

103 — ☑ Watanabe's Home
103 — ☑ Daikon (Radish) festival, *Hannya* seminar
103 — ☑ Yokohama port "Watch-night whistle"

[Set destination] — 104

FIG. 26

Reply mail

Return | Top

Select reply message.
- ⦿ Yes.
- ○ No.
- ○ I will contact you later.
- ○ I understand.
- ○ I read your mail.
- ○ I am here.

Attach position and send mail.
[Attach current position]
[Attach destination]
[Attach position by selecting map]
[Send mail without attaching position]

SYSTEM FOR SENDING AND RECEIVING E-MAIL TO WHICH A PLURALITY OF POSITIONAL DATA ARE ATTACHABLE

BACKGROUND OF THE INVENTION

1. Field of the Invention

The present invention relates to an e-mail (i.e., electronic mail) sending and receiving system for providing a variety of services to addressers and addressees, by automatically adding positional data of any place to e-mail.

2. Description of the Related Art

Conventionally, services for providing map images, in which a map image database is provided in a server on the Internet, and is searched by using key words such as an address, postal code, station name, spot (or location) name or the like, so as to provide a map image around a target position coordinate, are known. The user can obtain a map image of a desired place by inputting the key words such as an address, postal code, station name, spot name (i.e., the name of position) or the like, by using a WWW (world wide Web) browser.

Japanese Patent Publication No. Hei 11-259390 (Nakano et al.) provides an e-mail system and method that composes an e-mail information including a map information and transmitting the e-mail information. At a transmitting-side of terminal, a user obtains a map image data of a desirable point by connecting to a map information provision system and inputs an arbitrary-manually-scripted information onto the obtained map image data. The obtained map image data with the inputted scripted information is then complied to compose new image data. Consequently, the transmitting-side of terminal transmits an e-mail information including the map image data with the manual script of a document data to a mail server of a recipient.

Japanese Unexamined Patent Application, First Publication, No. Hei 11-53278 discloses a system in which if an e-mail message to be sent includes an address or the like, a map image database is automatically searched using the address as a key word, and the URL for viewing a map image is included in the e-mail, and then the e-mail is sent.

However, in the above-explained conventional techniques, data about only one place can be included in an e-mail message, and data of a plurality of places cannot be included. It is extremely inconvenient. Additionally, in the conventional techniques, the addressee can only view and print a Web page according to the sent data. Therefore, it is also inconvenient. In addition, only the URL of a map image and the text data input by the user can be included in the text of e-mail, so that data to be transmitted may be insufficient.

Also in the conventional techniques, data which the addressee can refer to is limited to the text of the e-mail (input by the addresser) and the Web page via the WWW browser. Furthermore, the e-mail is sent using a single format, so that the e-mail cannot be shown on a device such as a car navigation system which receives e-mail using another format. Therefore, it is also inconvenient.

SUMMARY OF THE INVENTION

In consideration of the above circumstances, an objective of the present invention is to provide an e-mail sending and receiving system by which positional data about a plurality of places can be included in an e-mail message to be sent, and further detailed data can be obtained based on the included positional data, thereby improving the convenience and effectiveness of the positional data.

Positional data is geographic in nature and includes coordinate data on a map (e.g., longitude and latitude data) and map images, as well as spot names (i.e., names of places), addresses, phone numbers, postal codes and additional data for explaining a relevant place.

Therefore, the present invention provides an e-mail sending and receiving system for sending and receiving e-mail between communication terminals, where each e-mail message is written on a Web page provided by a communication center (e.g., map data providing site 20 explained in the following embodiment), and each communication terminal is provided in a mobile station (e.g., car navigation system 33 explained in the following embodiment) or a fixed station (e.g., user terminal 30 or 31 explained in the following embodiment), the system comprising:

a mail generating section (e.g., e-mail generating and sending section 41 in the following embodiment) for generating an e-mail message to be sent to an addressee;

a positional data storage section (e.g., user database 24 explained in the following embodiment) for storing a plurality of positional data; and a positional data attaching section (e.g., e-mail generating and sending section 41 explained in the following embodiment) for attaching one or more of the positional data stored in the positional data storage section to the e-mail message generated by the mail generating section.

According to the positional data attaching section in the above structure, a plurality of positional data can be attached to a single e-mail message, and the addressee can obtain detailed information based on the attached positional data. Therefore, the convenience of the positional data can be improved.

The positional data storage section may include a plurality of positional data registered by an addresser. Accordingly, one or more of the positional data registered by the addresser can be attached to the message generated by the mail generating section. That is, a plurality of positional data which the addresser registered in advance can be attached to e-mail, and the addressee can obtain detailed information based on the attached positional data. Therefore, the convenience of the positional data can be improved.

The positional data storage section may include a plurality of positional data registered by the communication center. Accordingly, one or more of the positional data registered by the communication center can be attached to the message generated by the mail generating section. That is, a plurality of positional data which the communication center provided can be attached to e-mail, and the user can receive a variety of services.

Preferably, the mail generating section generates each e-mail message by using a format suitable for the communication terminal of the addressee, so that the communication terminal can read the e-mail message. Accordingly, each e-mail message is generated based on a format by which the communication terminal of the addressee can read the e-mail. Therefore, the communication terminal of the addressee may be a personal computer, a car navigation system, or the like, and the addressee can read the mail on each terminal.

The e-mail sending and receiving system may further comprise a detailed data generating section for generating detailed data relating to each positional data attached to the e-mail message, and attaching a URL for accessing the detailed data to the e-mail message. In this case, the e-mail sending and receiving system may further comprise a positional data register section for storing the detailed data in the positional data storage section according to a request from the communication terminal of the addressee.

Accordingly, the addressee can view detailed data relating to each positional data, and the detailed data can be registered and used later if the addressee sends a request. Therefore, the convenience of the positional data can be improved.

BRIEF DESCRIPTION OF THE DRAWINGS

FIG. 2 is a block diagram showing the detailed structure of the map data providing site.

FIGS. 3A and 3B are diagrams respectively showing data structures applied to contents database 23 and user database 24.

FIGS. 4A and 4B are diagrams showing data structure of user data stored in the user database 24.

FIG. 18 is a diagram showing a Web page ("Transmission completed") provided by the WWW server in the embodiment.

FIG. 22 is a diagram showing an example of the picture (which shows the spot list) of the car navigation system in the embodiment.

FIG. 23 is a diagram showing an example of the picture (which shows the text of e-mail) of the car navigation system in the embodiment.

FIG. 24 is a diagram showing an example of the picture (which shows the text of e-mail, and information of the attached course data) of the car navigation system in the embodiment.

FIG. 25 is a diagram showing an example of the picture (which shows the course list) of the car navigation system in the embodiment.

FIG. 26 is a diagram showing an example of the picture for replying to the received e-mail in the car navigation system of the embodiment.

DESCRIPTION OF THE PREFERRED EMBODIMENTS

Hereinafter, embodiments according to the present invention will be explained in detail with reference to the drawings.

Structure of the Embodiment

Figure 1:
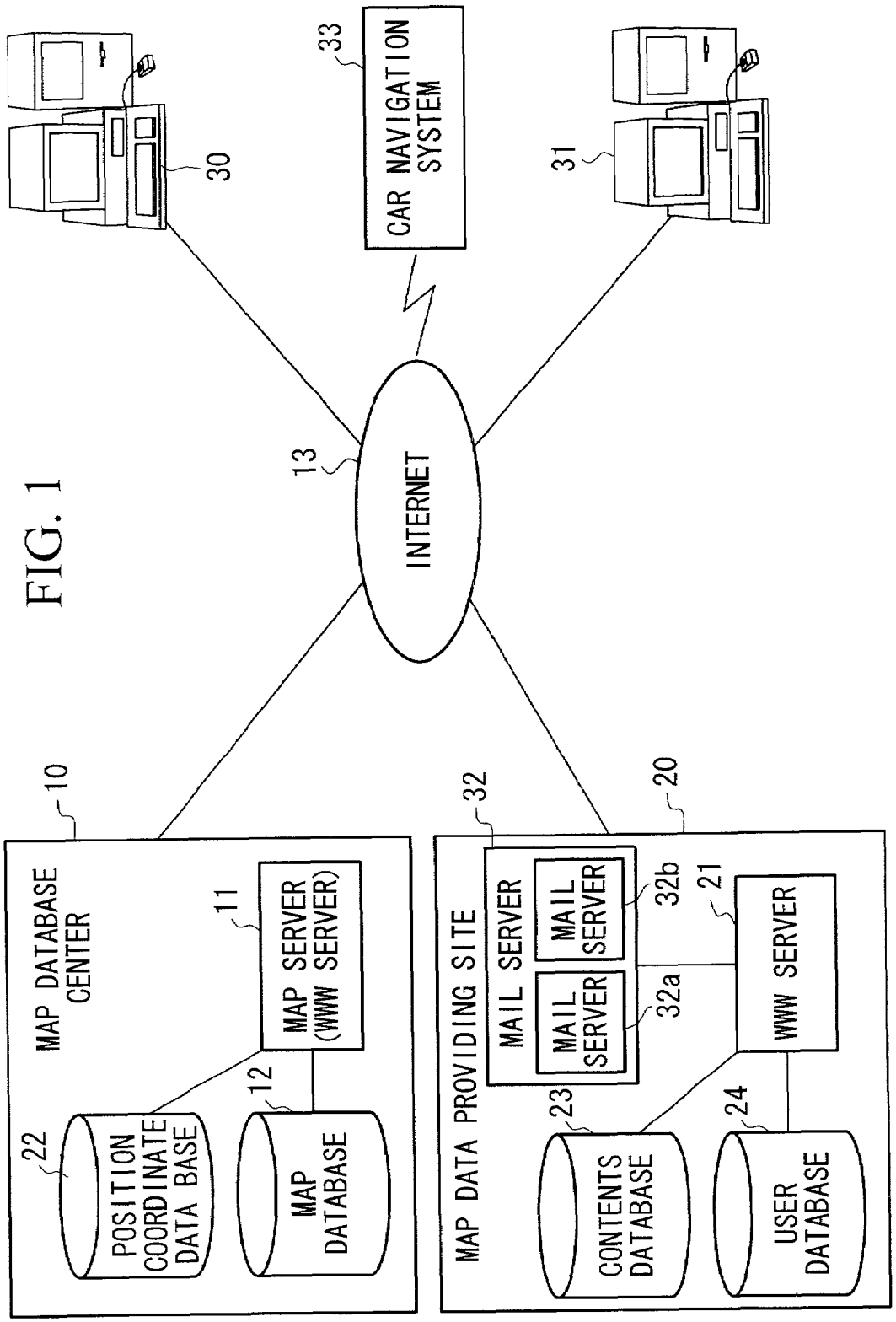
FIG. 1 is a diagram showing the structure of the general structure of an embodiment according to the present invention.

FIG. 1 is a block diagram showing the general structure of an embodiment of the present invention. In the figure, map database center 10 provides a map search and display service on the Internet, and comprises a map server 11 using a WWW server, a map database 12, and a position coordinate database 22.

The map database 12 stores physical positional data on a map (i.e., coordinate data), such as longitude and latitude data, and map images corresponding to the positional data. The map images are arranged in a hierarchical structure according to the reduction scale of each. That is, plural reduction levels of map images, such as a map image of the whole of Japan, and map images of each prefecture, are stored.

The position coordinate database 22 stores positional data (i.e., coordinate data) corresponding to station names and addresses.

In response to a designation or an indication from user terminal 30 or 31, the map server 11 searches the position coordinate database 22, and searches the map database 12 for a corresponding map image and sends the map image via the Internet 13 to user terminal 30 or 31.

The map data providing site 20 is a WWW site, that is, functions as a data providing system on the Internet for providing multimedia information including plural kinds of data such as character data, image data, and voice data, by using a hypertext format (e.g., HTML). The map data providing site 20 comprises a WWW server 21, contents database 23, and user database 24.

The WWW server 21 accesses the contents database 23 and user database 24 according to the search conditions designated by user terminal 30 or 31, thereby retrieving positional data corresponding to the search conditions and showing the data on the Web page. The WWW server 21 also generates an e-mail message according to the instruction of the user terminal 30 or 31, and adds the physical positional data obtained from the databases 23 and 24 to the e-mail and sends the e-mail to the e-mail address (of the relevant mail server) of a designated addressee. Here, the physical positional data indicates the spot name (i.e., name of a position or place), position coordinate, address, phone number, postal code, and additional data for explaining the relevant place. The contents database 23 and user database 24 will be explained below in detail.

The user terminal 30 or 31 can receive services provided by the map database center 10 and map data providing site 20, by using a WWW browser. In the present embodiment, the user terminal 30 or 31 can access the map data providing site 20 by using a WWW browser, and view a Web page provided by the WWW server 21 in the map data providing site 20. Here, the user terminal 30 or 31 can select data from various choices and input search conditions on the Web page, thereby obtaining positional data related to a desired place, and designating the WWW server 21 to send an e-mail message to an addressee, where the obtained positional data is attached to the e-mail, and this designation can be executed on the Web page.

The mail server 32 comprises the first mail server 32a provided for user terminals such as personal computers (or the like), and the second mail server 32b provided for user terminals such as devices other than the personal computers, that is, devices (such as car navigation systems in the present embodiment) for receiving e-mail using a format other than that applied to the personal computers. The mail server 32 has a virtual mail box for each mail address, and stores each received e-mail message in a corresponding mail box according to the mail address of the addressee. If a user (at the receiving side) accesses the system, the mail server 32 sends e-mail (stored in the corresponding mail box) addressed to the user, to the relevant user terminal according to the mail address of the user.

The car navigation system 33 is built in a vehicle, and has the function of showing a map image in a display area, where map images are stored in a storage medium (CD-ROM, DVD-ROM, or the like) provided in this navigation system. The car navigation system 33 has additional function of showing the current position of the vehicle on a map image in real time, according to the driving speed and direction of the vehicle. The car navigation system 33 can also access the Internet so as to send and receive e-mail. The format of e-mail applied to the car navigation system differs from that applied to general personal computers or the like; therefore, the car navigation system 33 accesses the dedicated mail server 32b provided for the car navigation systems, so as to receive e-mail written on the format applied to the car navigation systems. In addition, when positional data of a place or places are included in a received e-mail message, the car navigation system 33 can set the navigation route according to the positional data.

FIG. 2 is a block diagram showing the detailed structure of the above-explained map data providing site 20. FIGS. 3A and 3B are diagrams respectively showing data structures applied to contents database 23 and user database 24. FIGS. 4A and 4B are diagrams showing the data structure of user data stored in the user database 24.

In FIG. 2, the WWW server 21 (refer to FIG. 1) comprises a processing section 40, an e-mail generating and sending section 41, and communication I/F section 42.

The processing section 40 includes a memory (i.e., storage medium) and CPU (not shown), and executes predetermined functions by loading and executing relevant programs on the memory. That is, in response to the access from a user, the processing section 40 (i) sends a specific Web page (that is, the corresponding hypertext) via the Internet to the relevant user terminal, (ii) searches the contents database 23 and user database 24 according to a designation which the user inputs on the Web page, or (iii) controls the Web page so as to show the search results on a display of the user terminal.

As shown in FIG. 3A, the contents database 23 stores each spot name and its positional data (including position coordinate data) and additional data in a corresponding relationship. The spot names are names of landmarks such as public facilities, institutions, places of amusement, amusement parks, shops, buildings, and the like.

As shown in FIG. 3B, the user database 24 stores a user ID (generally, e-mail address) for identifying each user, a password for indicating that the user has been legally registered in the present service providing system, and user data (explained below) in a corresponding relationship. The user data are input and registered in advance by each user, and may include one or more spot names (see FIG. 4A), or course data including a plurality of spot names (see FIG. 4B). The format as shown in FIG. 4B may be used by car navigation systems or the like. In addition, a category name is assigned to each spot name, so that the data can be classified using categories.

Therefore, the WWW server 21 can access the contents database 23 and obtain positional data and additional data corresponding to a spot name. Additionally, the WWW server 21 can access the user database 24 and obtain data of the spots or the courses including a plurality of spots which the user inputs in advance. Here, when the name of a spot is obtained, the positional data and additional data corresponding to the spot name can of course be retrieved from the contents database 23.

The e-mail generating and sending section 41 generates an e-mail message using text data such as the e-mail address of an addressee and the text of the message input by the user on a Web page provided by the processing section 40, and automatically adds the following data to the e-mail, that is, spot names, their positional data, relevant additional data, URL of a Web page for showing a map image of an area where the relevant spot exists, and the like. The e-mail generating and sending section 41 sends the generated e-mail via the communication I/F section 42. The communication I/F section 42 is an interface between the communication lines of the Internet (or the like) and the present system, and sends Web pages (on the HTML format) or e-mail according to the control of processing section 40. The Web page generating section 43 generates detailed information Web pages to which URLs of other Web pages are linked, so that the user can view map images corresponding to the positional data of spots indicated by spot names included in the e-mail, the weather conditions at the spot, or the like. The Web pages are generated by using hypertext (e.g., HTML).

Operation of the Embodiment

Figure 5:
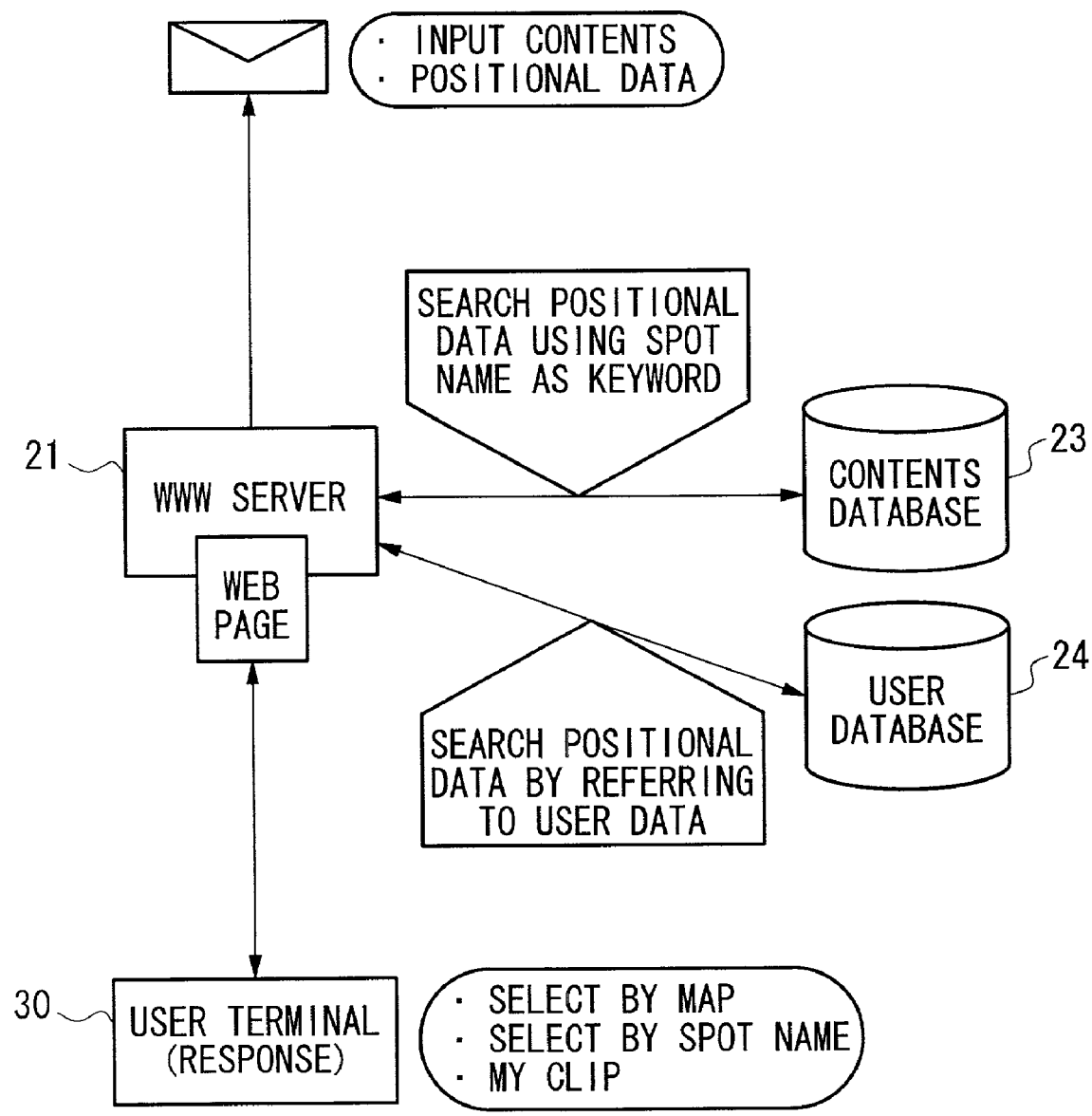
FIG. 5 is a diagram showing the functions of the operation in the embodiment.
Figure 6:
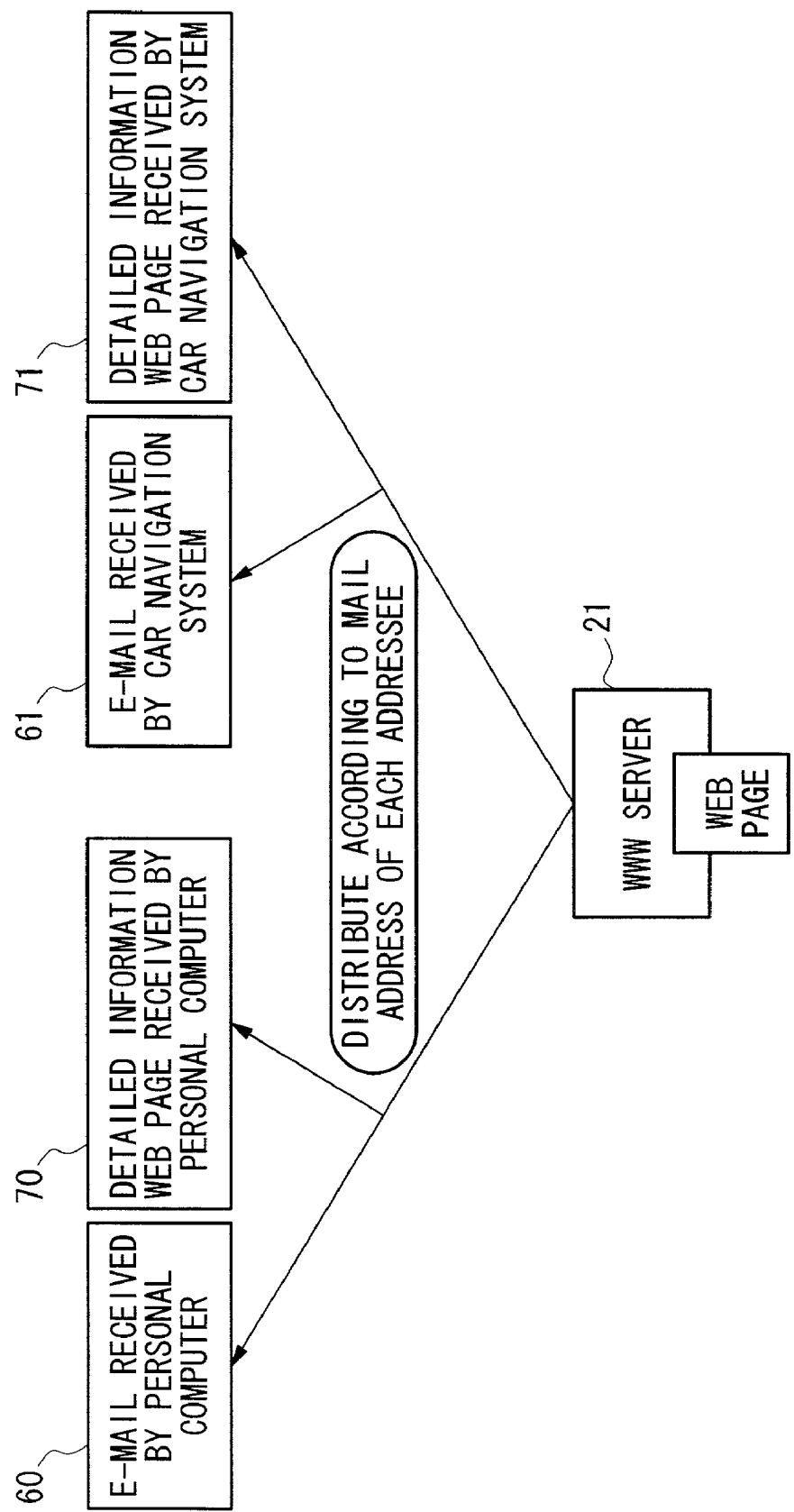
FIG. 6 is also a diagram showing the functions of the operation in the embodiment.

Below, the operation of the present embodiment will be explained in detail. FIGS. 5 and 6 are diagrams showing the functions of the operation. FIGS. 7 to 18 are diagrams showing a series of Web pages used for the search of the positional data and the writing and sending of e-mail.

Figure 7:
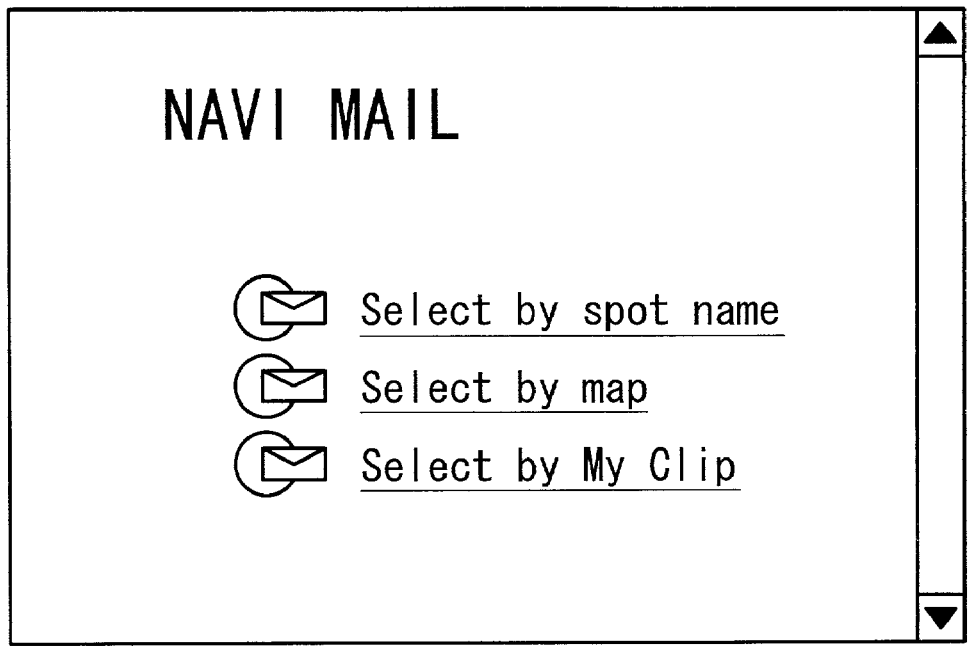
FIG. 7 is a diagram showing a Web page (top page) provided by the WWW server in the embodiment.

First, when the user accesses the WWW server 21 via the user terminal 30, a Web page (home page) as shown in FIG. 7 is sent to the user terminal 30 by the WWW server 21. The sent Web page is shown on the display of the user terminal 30 by the WWW browser of the user terminal. As shown in FIG. 7, in the first Web page, the three items "Select by spot name", "Select by map", and "Select by My Clip" are shown as three choices for selecting a place to be searched for.

Figure 8:
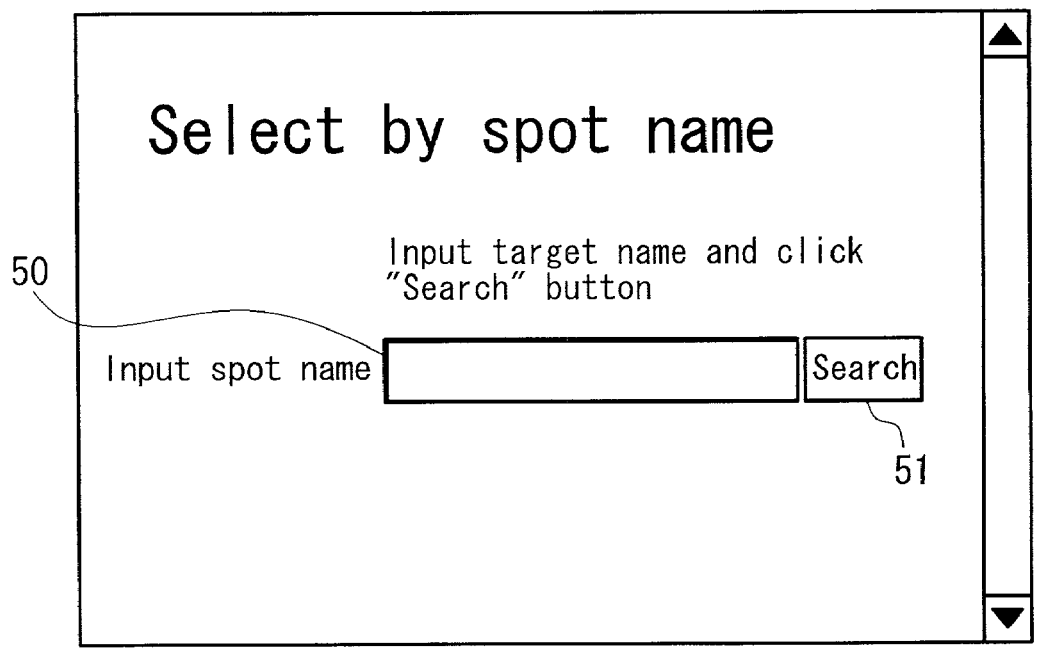
FIG. 8 is a diagram showing a Web page ("Select by spot name") provided by the WWW server in the embodiment.

If the user selects the item "Select by spot name", then a Web page as shown in FIG. 8 is sent to the user terminal 30 by the WWW server 21, and is shown by the WWW browser of the user terminal 30. In the Web page shown in FIG. 8, an input box 50 for inputting a spot name, and a "Search" button 51 for starting the search using the input spot name as a key word are shown. When the user writes (i.e., inputs)

a desired spot name in the input box 50 and clicks the "Search" button 51, the WWW server 21 searches the contents database 23 using the spot name input into the input box 50 as a key word, and retrieves positional data and additional data corresponding to the spot name.

Figure 9:
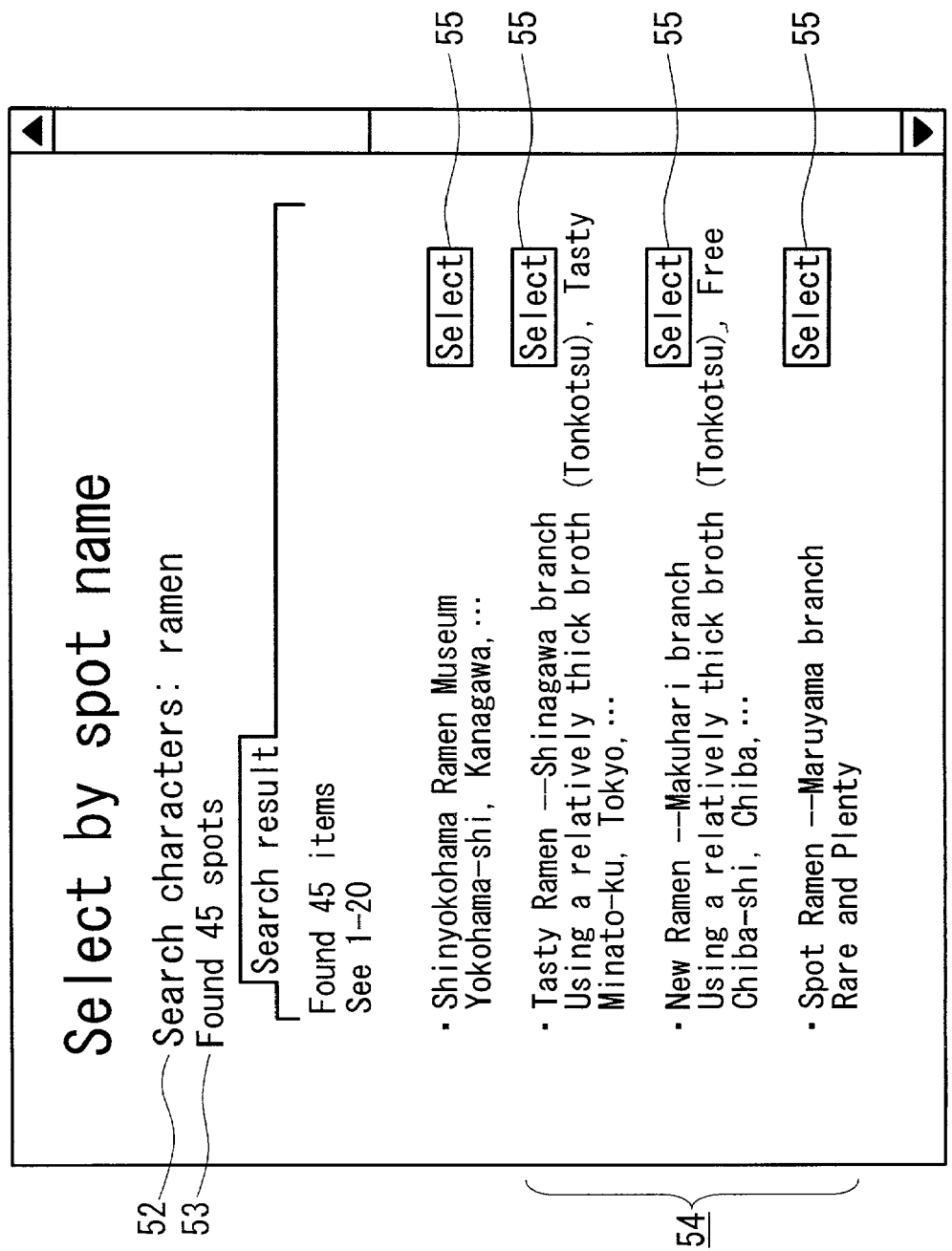
FIG. 9 is a diagram showing a Web page ("Select by spot name") provided by the WWW server in the embodiment.

The WWW server 21 then sends a Web page as shown in FIG. 9 together with the positional data and additional data associated with the spot name to the user terminal 30, and the Web page is shown by the WWW browser of the user terminal 30. The Web page in FIG. 9 shows "Search characters" 52, which is a spot name input by the user (here, "ramen", which denotes a Chinese noodle served in a soup), information 53 indicating the number of spots, each including the characters of the spot name (45 spots in the example of FIG. 9), and spot names and relevant additional data 54. A "Select" button 55 for selecting each spot name is attached to the spot name. The user can select a spot name by clicking the "Select" button corresponding to the spot name on the Web page of FIG. 9. If many spots were found and some of them cannot be shown on the screen, then the remaining data can be viewed by using a scroll bar shown at the right side of the Web page.

Figure 10:
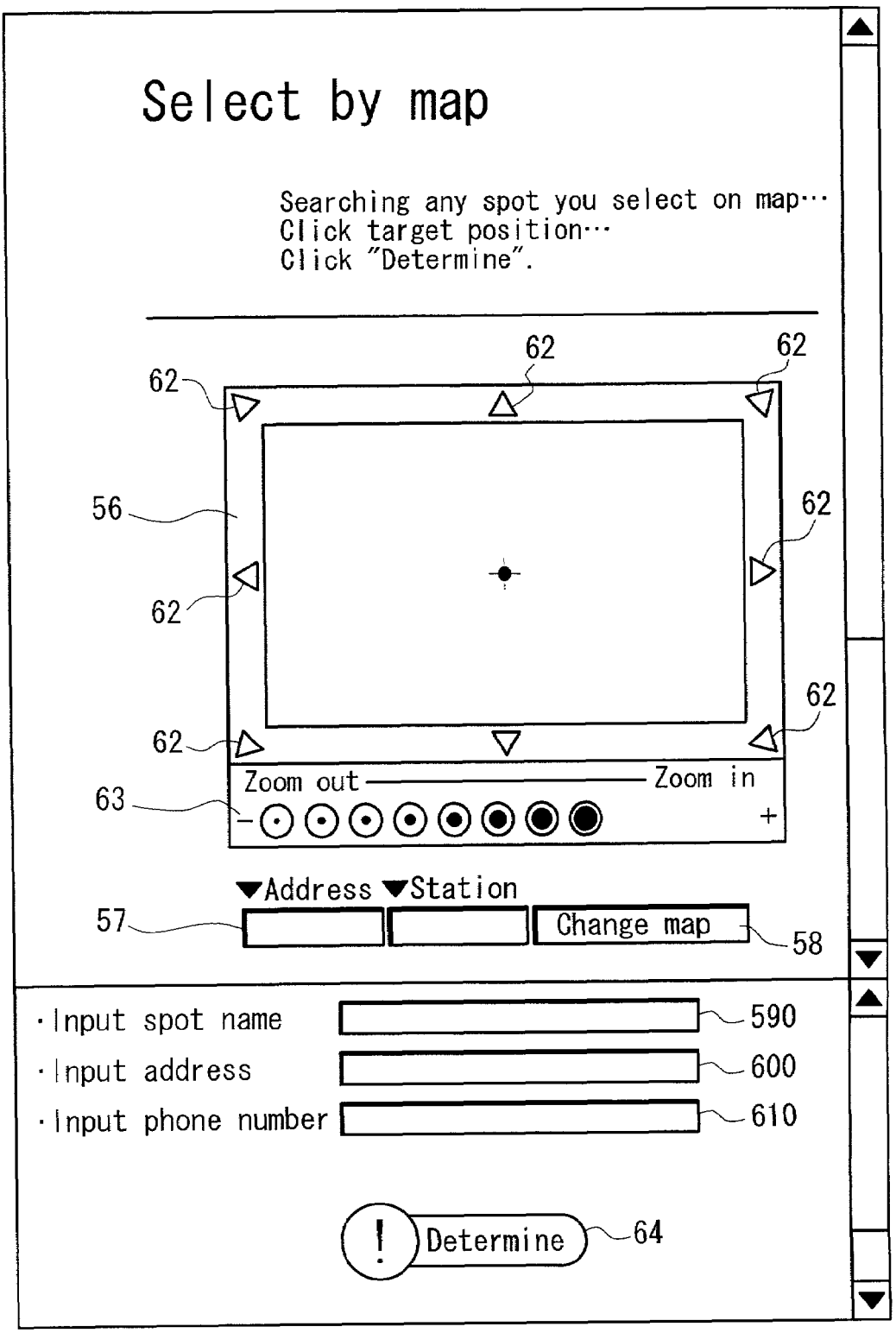
FIG. 10 is a diagram showing a Web page ("Select by map") provided by the WWW server in the embodiment.

If in the Web page shown in FIG. 7, the user selects the item "Select by map", the WWW server 21 sends a Web page as shown in FIG. 10 to the user terminal 30, and the Web page is shown by the WWW browser of the user terminal 30. The Web page of FIG. 10 shows a map display area 56 for showing a map image, input boxes 57 for designating a map to be shown, and an "Change map" button 58 for changing the map image shown in the map display area 56. Additionally, input boxes 590, 600, 610 are provided (in the lower area of the Web page of FIG. 10) for attaching a spot name, address, and phone number to the position (coordinate) selected by the user.

In the map display area 56, shift buttons 62 are provided for shifting the map image shown in this area. Additionally, reduction scale select buttons 63 are provided for designating the level of the reduction scale. When the user inputs an address or station name, a map image is shown in the map display area 56. The user can move the map image by using the shift buttons 62 so as to position a target spot at the center of the map display area 56, and change the reduction scale by using the reduction scale select buttons 63. The user then selects a map showing the target place by clicking the "Determine" button.

Figure 11:
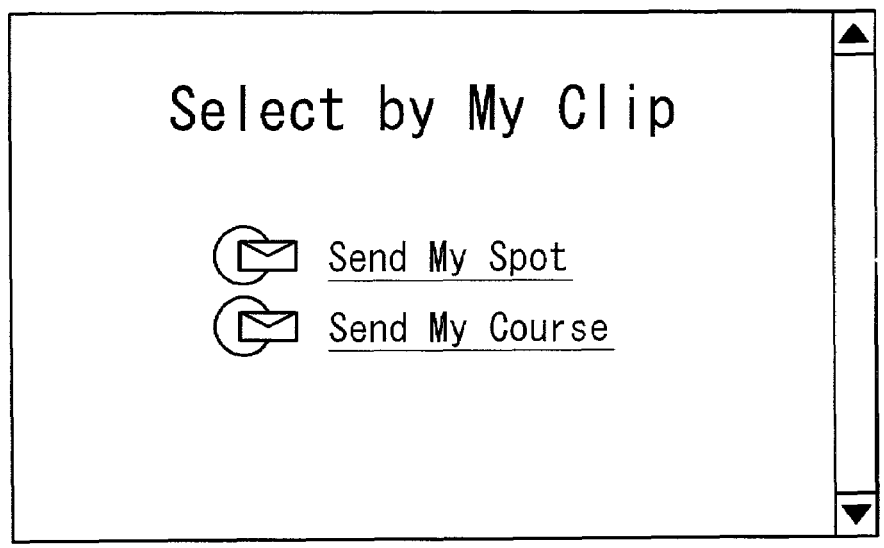
FIG. 11 is a diagram showing a Web page ("Select by My Clip") provided by the WWW server in the embodiment.

In the Web page shown in FIG. 7, if the user selects the item "Select by My Clip", the WWW server 21 sends a Web page as shown in FIG. 11 to the user terminal 30, and the sent page is shown by the WWW browser of the user terminal 30. The Web page shown in FIG. 11 shows two search methods, such as "Send My Spot" and "Send My Course".

If the user selects the item "Send My Spot", the WWW server 21 accesses the user database 24, and retrieves the spot name(s) in the stored user data, which have been registered corresponding to the relevant user ID. The WWW server 21 also accesses the contents database 23 and retrieves the positional data and additional data corresponding to each spot name. In order to show these data, the Web page shown in FIG. 12 is sent to the user terminal 30 and the sent page is shown by the WWW browser of the user terminal 30.

Figure 12:
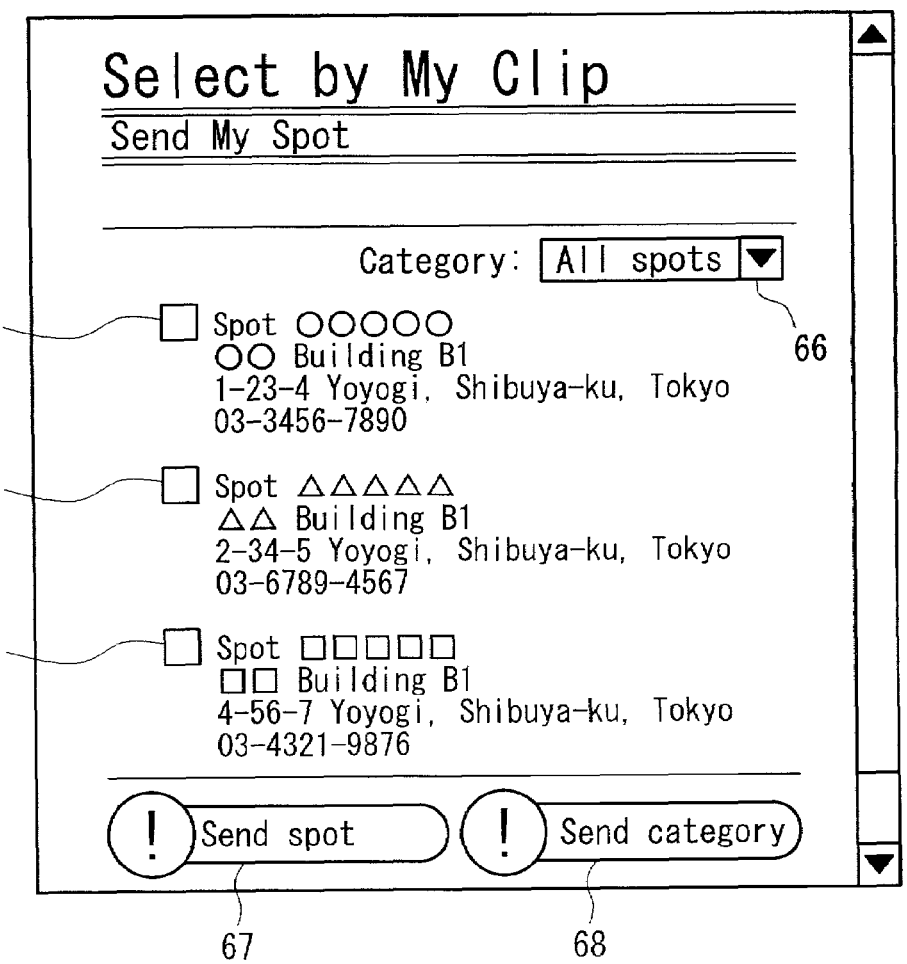
FIG. 12 is a diagram showing a Web page ("Send My Spot") provided by the WWW server in the embodiment.

The Web page of FIG. 12 shows the spot names which have been registered by the user, and the positional data and additional data, that is, detailed information of the spot. In addition, check boxes 65 are provided for the spot names, so as to select each spot name. The user can select one or more spot names by checking (i.e., clicking) the check box 65 corresponding to each target spot name. Therefore, a plurality of spot names can be selected.

The spot names stored in the user database 24 can be classified using category names (refer to FIG. 4A). The category can be selected using a pull-down box 66, and only spot names belonging to a specific category can be shown in the Web page as shown in FIG. 12. In the shown example, "All spots" is selected, so that the all of the registered spot names are shown. The user checks the check box 65 of each target spot name, and then clicks the "Send spot" button 67 or "Send category" button 68. Here, the "Send spot" button 67 is clicked for sending the selected spot name(s) by e-mail, while the "Send category" button 68 is clicked for sending all of the spot names belonging to the selected category by e-mail.

Figure 13:
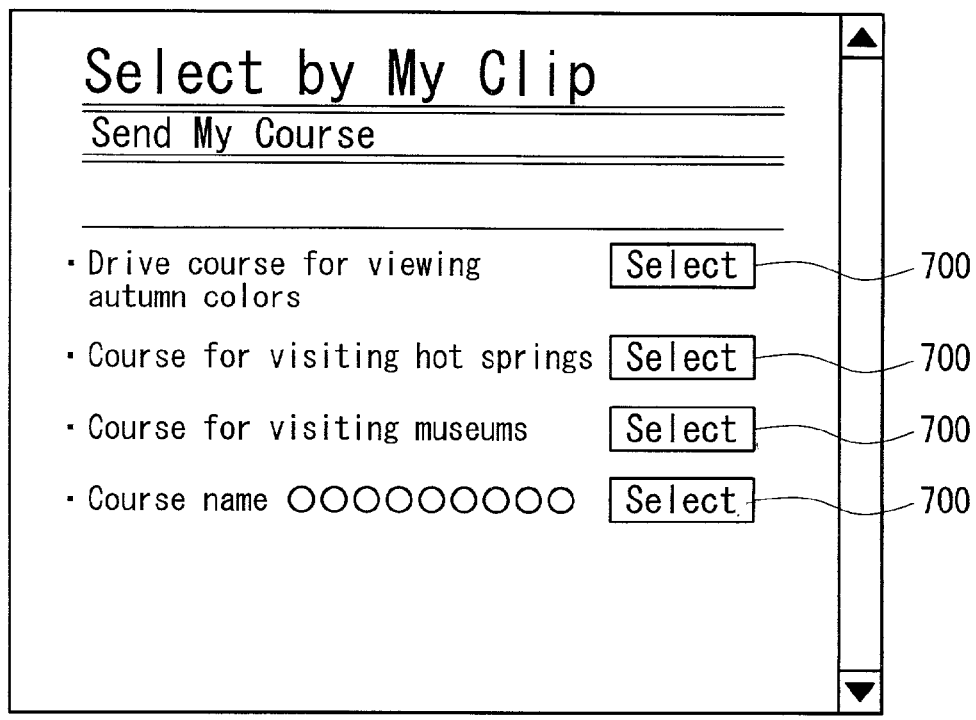
FIG. 13 is a diagram showing a Web page ("Send My Course") provided by the WWW server in the embodiment.

If the user selects the item "Send My Course", the WWW server 21 accesses the user database 24, searches the user data corresponding to the user ID of the user, and retrieves course names which have been registered in advance in the user data. In order to show the course names, the Web page as shown in FIG. 13 is sent to the user terminal 30, and is shown by the WWW browser of the user terminal 30. The Web page of FIG. 13 shows the course names registered in correspondence to the user. Additionally, "Select" buttons 700, 700, . . . are provided to each course name. The user selects a desired course name by clicking the "Select" button 700 corresponding to the course name.

Figure 14:
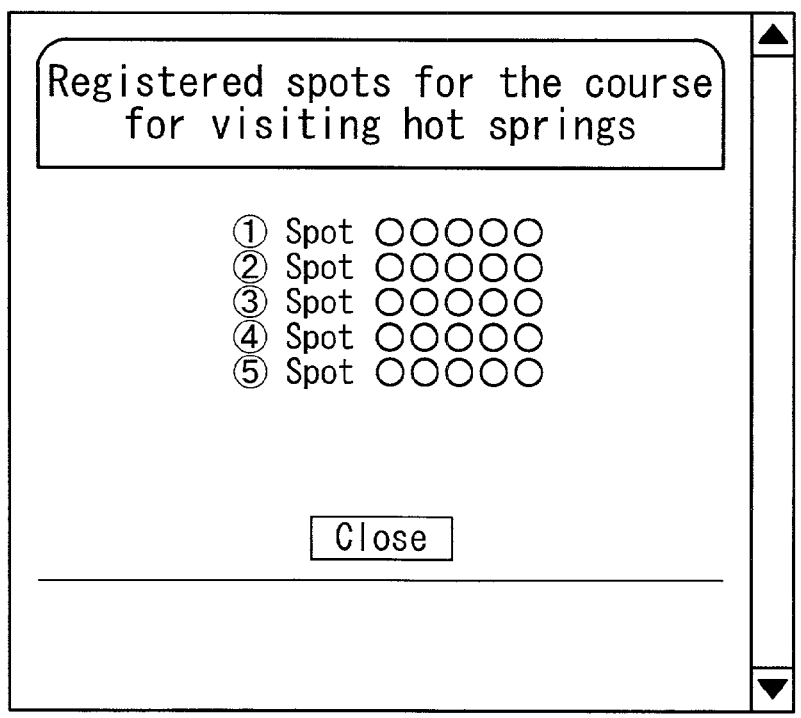
FIG. 14 is a diagram showing a Web page (for showing the spot names registered for the selected course name) provided by the WWW server in the embodiment.

When one of the course names is selected, the WWW server 21 accesses the user data base 24, and retrieves one or more spot names which have been registered in advance with respect to the selected course name. In order to show the spot names, a Web page as shown in FIG. 14 is sent to the user terminal 30 and is shown by the WWW browser of the user terminal 30. The Web page of FIG. 14 shows the spot names registered for the selected course name. In this case, a plurality of spot names can be shown. In other words, a plurality of spot names can be selected by selecting a course name.

Figure 15:
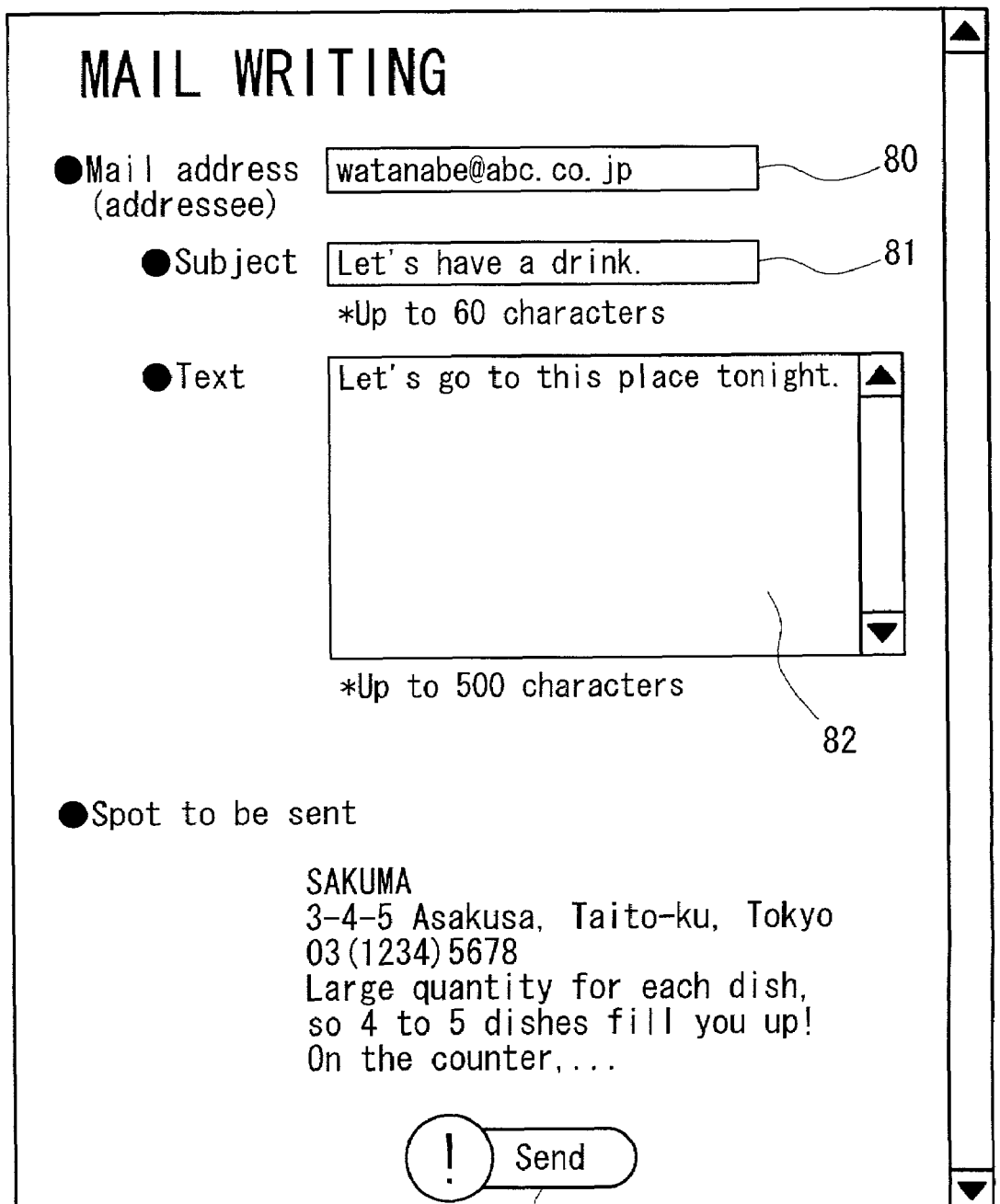
FIG. 15 is a diagram showing a Web page ("MAIL WRITING") provided by the WWW server in the embodiment.
Figure 16:
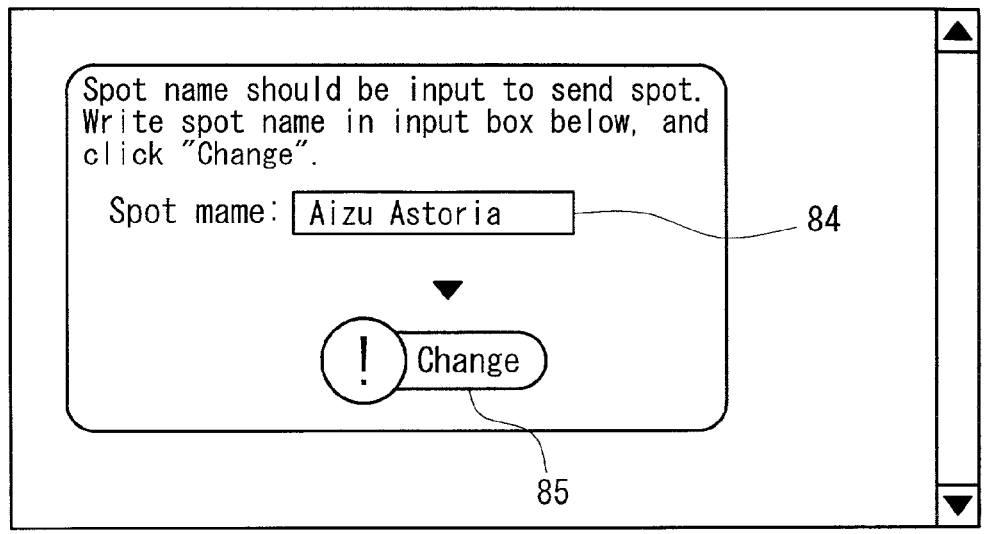
FIG. 16 is a diagram showing a Web page (for changing the spot name) provided by the WWW server in the embodiment.

When the user has determined one or more places to be notified about by e-mail by using one of the above three selecting method: "Select by spot name", "Select by map", and "Select by My Clip", the Web page as shown in FIG. 15 is sent to the user terminal 30 and is shown by the WWW browser of the user terminal 30. The Web page shown in FIG. 15 is provided for writing e-mail, and has an input box 80 for inputting the e-mail address of an addressee, an input box 81 for inputting the subject of the e-mail, and an input box 82 for inputting the text of the e-mail. On the Web page, the spot name indicating each selected place, and additional data (i.e., information) relating the spot are also shown. Here, if a plurality of places or spot names have been selected, each spot name and relevant additional data are shown. The user inputs (i.e., writes) the e-mail address of an addressee, the subject, and the text in the Web page of FIG. 15, and then clicks the "Send" button 83. If the user wants to change the spot name to be attached to the e-mail, the user can use an input box 84 on the Web page as shown in FIG. 16. That is, the user can change the spot name by inputting another spot name into input box 84, and clicking the "Change" button 85.

Figure 17:
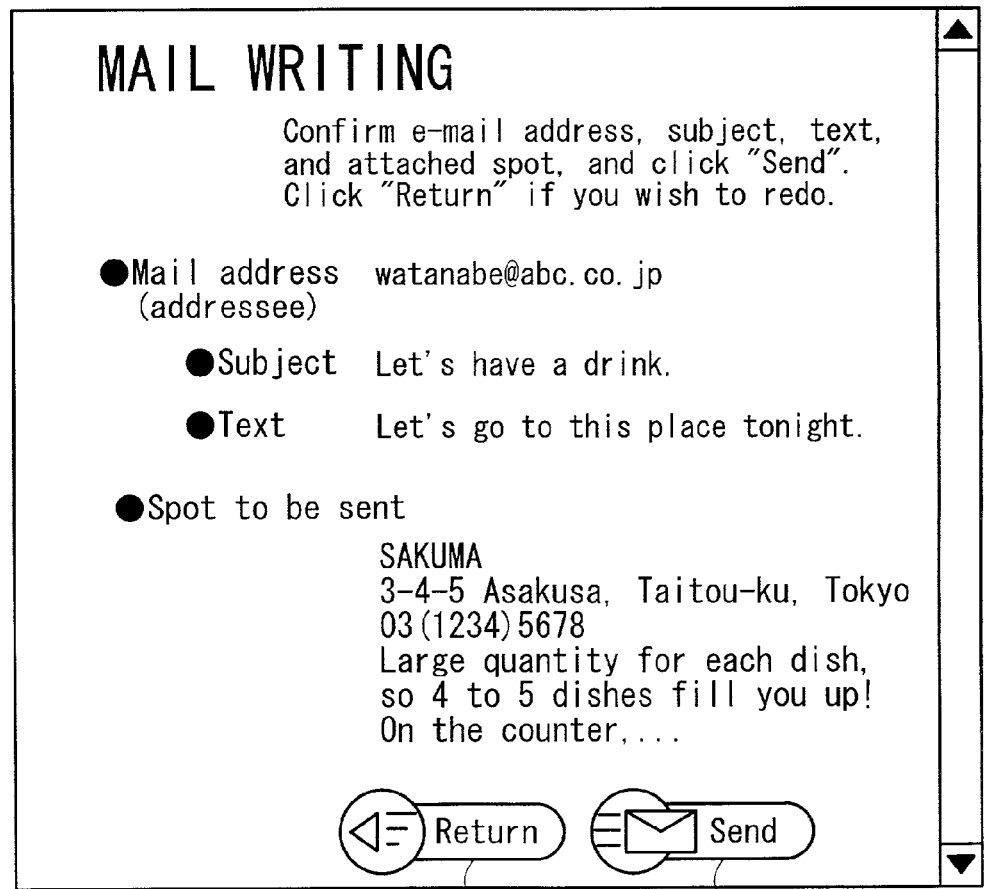
FIG. 17 is a diagram showing a Web page (for confirming the generated mail) provided by the WWW server in the embodiment.

When the "Send" button 83 in the Web page of FIG. 15 is clicked, the WWW server 21 sends a Web page as shown in FIG. 17 to the user terminal 30, and the Web page is shown by the WWW browser of the user terminal 30. In the Web page of FIG. 17, data which were input by the user on the Web page of FIG. 15 are shown so that they can be confirmed. The Web page of FIG. 17 also shows a "Return" button 86 for modifying the input data, and a "Send" button 87 for sending the e-mail. If the user clicks the "Return" button so as to modify the e-mail, the Web page of FIG. 15 is shown again.

If the user clicks the "Send" button 87, the WWW server 21 generates corresponding e-mail by using the e-mail generating and sending section 41, and sends the e-mail via the communication I/F section 42 to mail server 32 on the Internet (refer to FIG. 6). In the e-mail message, one or more selected spot names (or course names), the positional data of each spot indicated by the spot name, and additional data of the spot are added to the text of the message. A URL for accessing a detailed information Web page (explained below) is linked to each spot name, and a user who receives and opens the e-mail can access the detailed information Web page via the WWW browser, by clicking the spot name.

In the above process, if the mail address of the addressee belongs to a user who sends and receives e-mail by using a personal computer, the WWW server 21 generates and sends e-mail 60 based on a format suitable for the personal computer (see FIG. 6). The e-mail 60 is stored, for example, in mail server 32a. On the other hand, if the mail address of the addressee belongs to a user who sends and receives e-mail by using a car navigation system, the WWW server 21 generates and sends e-mail 61 based on a format suitable for the car navigation system. The e-mail 61 is stored, for example, in mail server 32b.

The WWW server 21 also generates a detailed information Web page to which other Web pages are linked, by using the Web page generating section 43, so that the user can refer to a map image or the weather corresponding to the positional data of the spot indicated by the spot name included in the e-mail message. The detailed information Web page is generated using hypertext (e.g., HTML). Also in this case, according to the e-mail address of the addressee, a detailed information Web page 70 received by a general personal computer and a detailed information Web page 71 received by a car navigation system are generated. When the transmission of e-mail has completed, the WWW server 21 informs the user of the completion of the transmission by the message on the screen as shown in FIG. 18.

Figure 19:
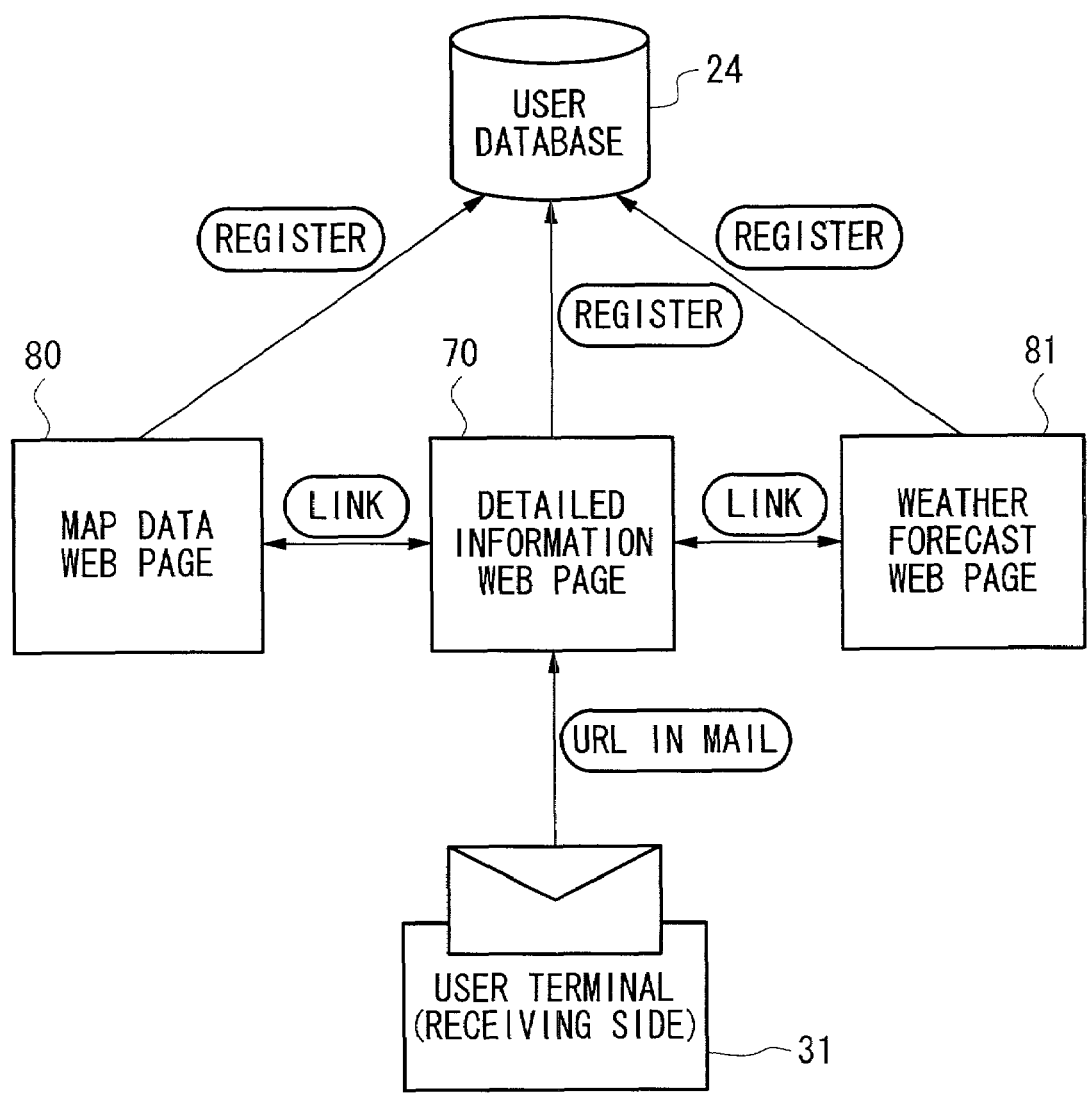
FIG. 19 is a diagram for explaining the operation relating to the received e-mail.

Below, the operation of the e-mail receiving side will be explained. FIG. 19 is a diagram for explaining the operation relating to the received e-mail.

First, the operation performed when the e-mail is received by a user terminal such as a general personal computer or the like will be explained. When the user accesses the mail server (here, mail server 32a in FIG. 1) by using a user terminal such as a general personal computer (e.g., user terminal 31 in FIG. 1) so as to receive e-mail, the mail server sends the e-mail stored in the mail box to the user terminal 31, according to the mail address of the user.

When the user opens the received e-mail message by using an e-mail software, one or more spot names, additional data (or information) of the spot indicated by each spot name, and the like, are also shown in addition to the main text of the e-mail. If the user clicks any spot name, the WWW browser is activated and as shown in FIG. 19, a detailed information Web page 70 managed by the WWW server 21 is accessed according to a URL which is linked to the relevant spot name. A map data Web page 80 for showing a map image corresponding to the positional data of the spot indicated by the clicked spot name, and a weather forecast Web page 81 for showing weather information or the like at the spot are linked to the detailed information Web page 70. Therefore, the user who received the e-mail can refer to the detailed information, the map image, weather, and the like relating to the clicked spot, simply by clicking the relevant spot name in the e-mail message. In addition, the data of the detailed information Web page 70, map data Web page 80, and weather forecast Web page 81 can be registered in the user database 24 by using a positional data register section (here, provided in the processing section 40) if the user who received the e-mail sends a request.

Below, the operation performed when the e-mail is received by car navigation system 33 will be explained. When the user accesses the mail server (here, mail server 32b in FIG. 1) so as to receive e-mail by using the car navigation system 33, the mail server sends the e-mail stored in the mail box to the car navigation system 33, according to the mail address of the user.

Figure 20:
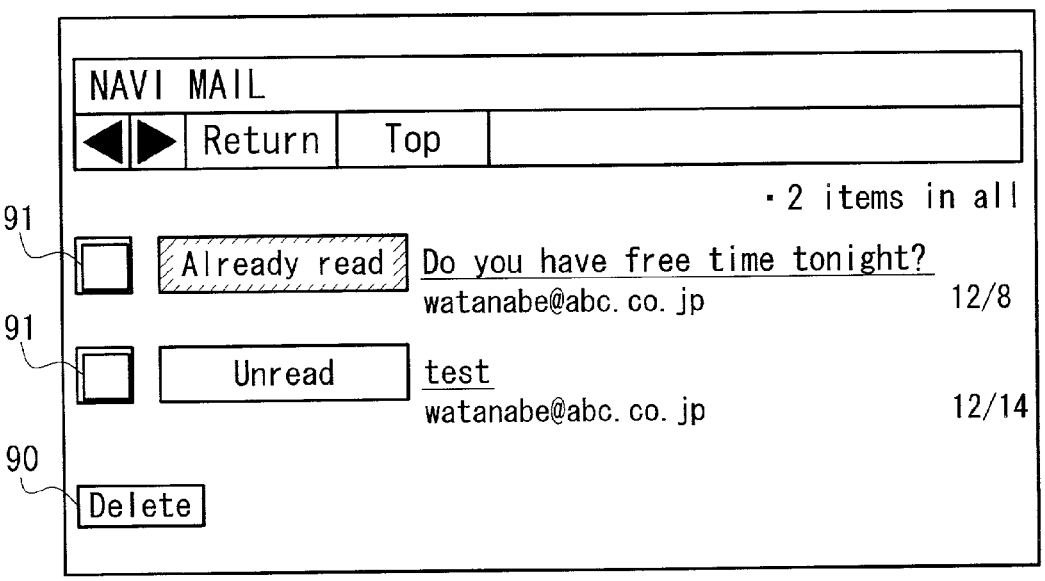
FIG. 20 is a diagram showing an example of the picture (which shows the list of e-mail messages) of the car navigation system in the embodiment.

When the user opens the received e-mail message by using e-mail software (called "NAVI MAIL"), the list of received e-mail messages is shown (see FIG. 20). For each received e-mail message in the list, the following items are shown: (i) information for indicating "Already read" or "Unread", (ii) the subject of each e-mail message ("Do you have time tonight?", and "test" in the example of FIG. 20), (iii) the mail address of the sender of each e-mail message, and (iv) the date that the e-mail was received. A "Delete" button 90 is also provided, and the user can delete an e-mail message by checking a check box 91 corresponding to the target e-mail, and clicking the "Delete" button 90.

Figure 21:
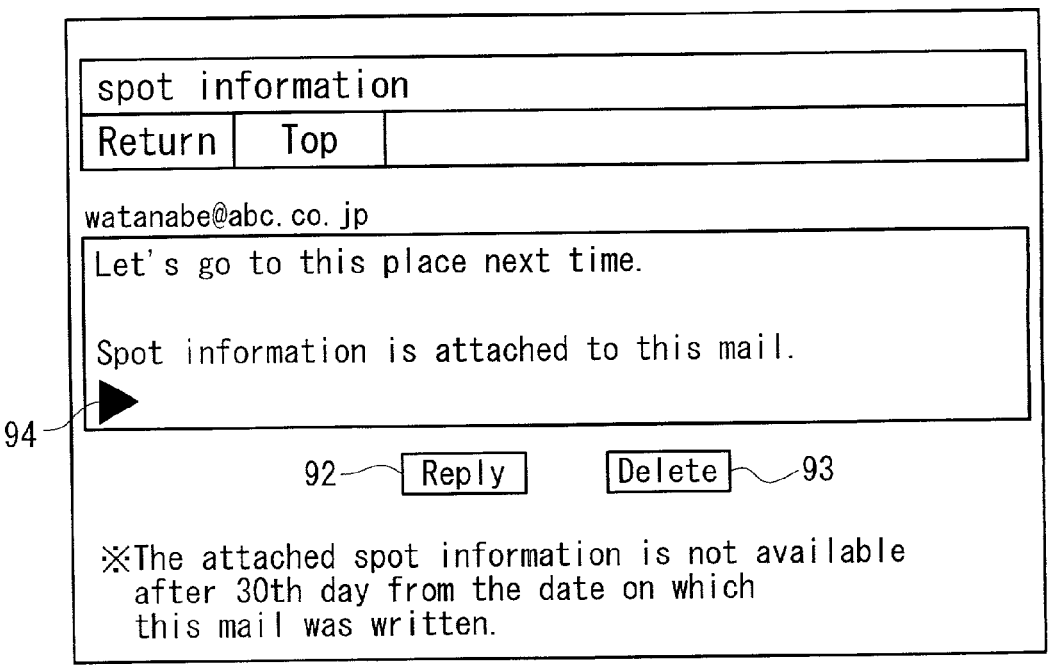
FIG. 21 is a diagram showing an example of the picture (which shows the text of e-mail, and information of the attached spot data) of the car navigation system in the embodiment.

When the user clicks the subject of an e-mail message which the user wants to read, the contents of the e-mail, that is, the text of the e-mail ("Let's go to this place next time" in the example shown in FIG. 21) is shown. In the picture as shown in FIG. 21, a "Reply" button 92 for immediately replying to (the addresser of) the received e-mail, and a "Delete" button 93 for deleting the relevant e-mail are provided. If spot information (spot name, additional data) is attached to the e-mail according to the above operation, a message for indicating the attachment of the spot information is shown under the text of the e-mail.

When the user clicks the mark 94 (see FIG. 21) under the above message, so as to see the attached spot information, a picture shown in FIG. 22 is displayed on the screen. The picture of FIG. 22 includes spot names attached to the e-mail, and additional data (or information) about the spot indicated by each spot name. In the present embodiment, a plurality of spot names can be attached to the e-mail. In the picture, when the user checks the check box 95 corresponding to a spot name and clicks a "Set destination" button 96, the positional data indicating the position of the relevant spot name is determined as the destination data in the course setting of the car navigation system 33. Therefore, the user can set the course according to the spot information attached to the e-mail.

If only one spot name is attached to the e-mail, the additional data is included in the text of the e-mail, as shown in FIG. 23. Also in this case, when the user clicks the "Set destination" button 97, the positional data indicating the position of the attached spot is determined as the destination in the course setting of the car navigation system 33. In the picture, a "Reply" button 98 for immediately replying to (the addresser) of the relevant e-mail, and a "Delete" button 99 for deleting the shown e-mail are also provided.

If a course name is attached to the e-mail, a message indicating the attachment of the course information is displayed under the text of the mail, as shown in FIG. 24. In the picture on screen, a "Set destination" button 100 is provided for determining the attached course as the destination. The picture also includes a "Reply" button 101 for immediate reply to (the addresser of) the relevant e-mail, and a "Delete" button 102 for deleting the shown e-mail.

When the user clicks the "Set destination" button 100, a picture as shown in FIG. 25 is shown. The picture shows the course name attached to the e-mail. When the user checks the check box 103 corresponding to a spot name and clicks the "Set destination" button 104, the positional data indicating the position of the spot corresponding to the attached course name is determined as the destination in the course setting of the car navigation system 33. Therefore, the user can set the driving course according to the course information attached to the e-mail.

FIG. 26 is a diagram showing an example of the picture (on screen) for replying to (the addresser) of the relevant e-mail. In this reply picture, a fixed sentence to be included in the e-mail is designated using radio buttons, and one of the methods for attaching the positional data can also be selected. The following are the methods for attaching the positional data: (i) to reply with positional data of the current position obtained by the car navigation system 33, (ii) to reply with positional data of the destination set in the car navigation system 33, (iii) to reply with positional data of a position selected by searching maps provided in the car navigation system 33, and (iv) to reply without positional data.

Other Embodiments

Below, other embodiments according to the present invention will be explained.

In the above embodiment, the contents database 23 stores additional data corresponding to each spot name. In addition to that, a course (including a plurality of spots), provided by the service supply side, may be registered and stored. In this case, when the user selects spot name(s) (or My Course) so as to attach and send the selected data to e-mail, the course registered by the service supply side in the contents database 23 may be selected.

Also in the above embodiment, the memory (storage medium) for storing the program for implementing the functions of the processing section 40 may be a portable storage medium such as a floppy disk, a magneto-optical disk, ROM, CD-ROM, or the like, or a storage device such as a hard disk built in a computer system. In addition, it is also possible to use a memory which can temporarily store the program, such as a RAM (i.e., volatile storage device) built in a computer system, where the computer system functions as a server or client when the computer system receives the program via a network (such as the Internet) or a communication line (such as a telephone line).

The above program may be transmitted from a computer system which comprises a storage medium storing the program, via (transmitted waves passing through) a transmission medium. Here, the transmission medium is a medium which can transmit data, such as a (communication) network such as the Internet, or a communication line such as a telephone line.

In addition, the program may execute a part of the above-explained functions, or these functions may be executed by a combination program of a "differential" program stored in a computer readable storage medium and an existing program which has already been stored in the computer system.

The embodiments of the present invention have been explained with reference to the drawings. However, possible embodiments are not limited to those, and any modifications or variations are possible within the scope and spirit of the claimed invention.

What is claimed is:

1. An e-mail sending and receiving system for sending and receiving e-mail between communication terminals, where each e-mail message is written on a Web page provided by a communication center, and each communication terminal is provided in a mobile or fixed station, the system comprising:

a mail generating section, for generating an e-mail message to be sent to an addressee;

a positional data storage section for storing a plurality of physical positional data, wherein the positional data storage section includes a plurality of physical positional data registered by an addresser;

a positional data attaching section for attaching one or more of the physical positional data corresponding to the receipt of a selected location at the web page to the e-mail message generated by the mail generating section, wherein the location is stored in the positional data storage section;

a detailed data generating section for generating detailed data relating to each physical positional data attached to the e-mail message, and attaching a URL for accessing the detailed data to the e-mail message; and an e-mail data receiving location hosting the web page for receiving at least one of an address of the desired addressee, e-mail text, and a desired location, wherein the e-mail message together with the one or more physical position data and the URL is sent to the addressee.

2. An e-mail sending and receiving system as claimed in claim 1, wherein the positional data storage section includes a plurality of physical positional data registered by the communication center.

3. An e-mail sending and receiving system as claimed in claim 1, wherein the mail generating section generates each e-mail message by using a format suitable for the communication terminal of the addressee, so that the communication terminal can read the e-mail message.

4. An e-mail sending and receiving system as claimed in claim 3, wherein the communication terminal of the addressee is a car navigation system.

5. An e-mail sending and receiving system as claimed in claim 4, wherein the e-mail generating section generates each e-mail message by using a format suitable for the car navigation system, so that the car navigation system can set the navigation route according to the physical positional data in the e-mail.

6. An e-mail sending and receiving system as claimed in claim 1, wherein the physical positional data includes at least one of a name, a coordinate, a physical address, a phone number, a postal code, and additional data for explaining a relevant physical place.

7. An e-mail sending and receiving system as claimed in claim 1, wherein the physical positional data is positional data on a map of a physical location.

8. An e-mail sending and receiving system as claimed in claim 1, further comprising means for searching for a location coupled to said positional data storage sections, said means comprising:

means for searching by map image;
means for searching by location name;
means for searching by category of location;
means for searching by location name among location names registered in advance by the user; and means for searching by course name among course names registered in advance by the user.

9. An e-mail sending and receiving system for sending and receiving e-mail between communication terminals, where each e-mail message is written on a Web page provided by a communication center, and each communication terminal is provided in a mobile or fixed station, the system comprising:
- a mail generating section for generating an e-mail message to be sent to an addressee;
- a positional data storage section for storing a plurality of physical positional data; and
- a positional data attaching section for attaching one or more of the physical positional data stored in the positional data storage section to the e-mail message generated by the mail generating section;
- a detailed data generating section for generating detailed data relating to each physical positional data attached to the e-mail message, and attaching a URL for accessing the detailed data to the e-mail message; and
- a positional data register section for storing the detailed data in the positional data storage section according to a request from the communication terminal of the addressee after the email message together with the one or more physical positional data and the URL is sent to the addressee.

10. An e-mail sending and receiving system for sending and receiving e-mail between communication terminals, where each e-mail message is provided by a communication center, and each communication terminal is provided in a mobile or fixed station, the system comprising:
- a mail generating section, for generating an e-mail message to be sent to an addressee;
- a positional data storage section for storing a plurality of physical positional data, wherein the positional data storage section includes a plurality of physical positional data registered by an addresser;
- a positional data attaching section for attaching one or more of the physical positional data corresponding to the receipt of a selected location at a web page, wherein the location is stored in the positional data storage section to the e-mail message generated by the mail generating section;
- a detailed data generating section for generating detailed data relating to each physical positional data attached to the e-mail message, and attaching a URL for accessing the detailed data to the e-mail message; and
- an e-mail data receiving location hosting the web page for receiving at least one of an address of the desired addressee, e-mail text, and a desired location,
- wherein the e-mail message together with the one or more physical position data and the URL is sent to the addressee.

11. An e-mail sending and receiving system as claimed in claim 10, wherein the positional data storage section includes a plurality of physical positional data registered by the communication center.

12. An e-mail sending and receiving system as claimed in claim 10, wherein the mail generating section generates each e-mail message by using a format suitable for the communication terminal of the addressee, so that the communication terminal can read the e-mail message.

13. An e-mail sending and receiving system as claimed in claim 10, wherein the physical positional data includes at least one of a name, a coordinate, a physical address, a phone number, a postal code, and additional data for explaining a relevant physical place.

14. An e-mail sending and receiving system as claimed in claim 10, wherein the physical positional data is positional data on a map of a physical location.

15. An e-mail sending and receiving system for sending and receiving e-mail between communication terminals, where each e-mail message is provided by a communication center, and each communication terminal is provided in a mobile or fixed station, the system comprising:
- a mail generating section for generating an e-mail message to be sent to an addressee;
- a positional data storage section for storing a plurality of physical positional data; and
- a positional data attaching section for attaching one or more of the physical positional data stored in the positional data storage section to the e-mail message generated by the mail generating section;
- a detailed data generating section for generating detailed data relating to each physical positional data attached to the e-mail message, and attaching a URL for accessing the detailed data to the e-mail message; and
- a positional data register section for storing the detailed data in the positional data storage section according to a request from the communication terminal of the addressee after the email message together with the one or more physical positional data and the URL is sent to the addressee.

16. An e-mail sending and receiving system for sending and receiving e-mail between communication terminals, where each e-mail message is written on a Web page provided by a communications center, and each communication terminal is provided in a mobile or fixed station, the system comprising:
- a mail generating section, for generating an e-mail message to be sent to an addressee, wherein the mail generating section generates each e-mail message by using a format suitable for the communication terminal of the addressee, so that the communication terminal can read the e-mail message, and wherein the communication terminal of the addressee is a car navigation system;
- a positional data storage section, for attaching one or more of the physical positional data corresponding to the receipt of a selected location at the web page to the e-mail message generated by the mail generating section, wherein the location is stored in the positional data storage section; and
- a detailed data generating section for generating detailed data relating to each physical positional data attached to the e-mail message, and attaching a URL for accessing the detailed data to the e-mail message,
- wherein the e-mail messaged together with the one or more of the physical positional data and the URL is sent to the addressee.

17. An e-mail sending and receiving system for sending and receiving e-mail between communication terminals, where each e-mail message is provided by a communication center, and each communication terminal is provided in a mobile or fixed station, the system comprising:
- a mail generating section, for generating an e-mail message to be sent to an addressee, wherein the mail generating section generates each e-mail message by using a format suitable for the communication terminal of the addressee, so that the communication terminal can read the e-mail message, and wherein the communication terminal of the addressee is a car navigation system;

a positional data storage section for storing a plurality of physical positional data;

a positional data attaching section for attaching one or more of the physical positional data corresponding to a selected location stored in the positional data storage section to the e-mail message generated by the mail generating section and a detailed data generating section for generating detailed data relating to each physical positional data attached to the e-mail message, and attaching a URL for accessing the detailed data to the e-mail message, wherein the e-mail messaged together with the one or more of the physical positional data and the URL is sent to the addressee.

18. An e-mail sending and receiving system for sending and receiving e-mail between communication terminals, where each e-mail message is written on a Web page provided by a communication center, and each communication terminal is provided in a mobile or fixed station, the system comprising:

a mail generating section, for generating an e-mail message to be sent to an addressee;

a positional data storage section for storing a plurality of physical positional data; and a positional data attaching section for attaching one or more of the physical positional data stored in the positional data storage section to the e-mail message generated by the mail generating section;

a destination setting section for setting one of the physical positional data attached to a received e-mail as a destination; and a detailed data generating section for generating detailed data relating to each physical positional data attached to the e-mail message, and attaching a URL for accessing the detailed data to the e-mail message, wherein the e-mail massaged together with the one or more of the physical positional data and the URL is sent to the addressee.

19. An e-mail sending and receiving system for sending and receiving e-mail between communication terminals, where each e-mail message is provided by a communication center, and each communication terminal is provided in a mobile or fixed station, the system comprising:

a mail generating section, for generating an e-mail message to be sent to an addressee;

a positional data storage section for storing a plurality of physical positional data; and a positional data attaching section for attaching one or more of the physical positional data stored in the positional data storage section to the e-mail message generated by the mail generating section; and a destination setting section for setting one of the physical positional data attached to a received e-mail as a destination; and a detailed data generating section for generating detailed data relating to each physical positional data attached to the e-mail message, and attaching a URL for accessing the detailed data to the e-mail message, wherein the e-mail messaged together with the one or more of the physical positional data and the URL is sent to the addressee.

* * * * *